US 7,738,655 B2

United States Patent
Sharon et al.

(10) Patent No.: US 7,738,655 B2
(45) Date of Patent: Jun. 15, 2010

(54) INTERFERENCE CANCELLER TAP SHARING IN A COMMUNICATIONS TRANSCEIVER

(75) Inventors: Daniel Sharon, Givataim (IL); Itay Lusky, Hod Hasharon (IL); Kobi Haim, Herzelia (IL); Nohik Semel, Kfar Saba (IL); Rafi Dalla Torre, Givataim (IL)

(73) Assignee: Texas Instruments Incorporated, Dallas, TX (US)

( * ) Notice: Subject to any disclaimer, the term of this patent is extended or adjusted under 35 U.S.C. 154(b) by 1097 days.

(21) Appl. No.: 11/403,406

(22) Filed: Apr. 12, 2006

(65) Prior Publication Data
US 2007/0263857 A1 Nov. 15, 2007

(51) Int. Cl.
H04M 9/08 (2006.01)

(52) U.S. Cl. .............................. 379/406.08; 379/392.01

(58) Field of Classification Search ............ 379/406.01, 379/392.01, 416, 417; 370/286–292; 455/570
See application file for complete search history.

(56) References Cited

U.S. PATENT DOCUMENTS 4,947,425 A * 8/1990 Grizmala et al. ....... 379/406.09
5,546,459 A * 8/1996 Sih et al. ............... 379/406.09
2001/0036160 A1 * 11/2001 Curran et al. ............ 370/290

OTHER PUBLICATIONS

Akihiko Sugiyama & Frederic Landais, A New Adaptive Intersubband Tap-Assignment Algorithm for Subband Adaptive Filters, in 5 International Conference on Acoustics, Speech and Signal Processing 3051 (IEEE May 1995).*

* cited by examiner

Primary Examiner—Walter F Briney, III
(74) Attorney, Agent, or Firm—Steven A. Shaw; W. James Brady; Frederick J. Telecky, Jr.

(57) ABSTRACT

A novel mechanism for sharing filter taps across a plurality of interference cancellers. Each interference canceller may be directed to impairment, such as Ethernet impairments, including Ethernet 1000Base-T impairments. Various interference impairments include echo cancellation, NEXT cancellation and/or other interference detection or cancellation, etc. The hardware requirements of the interference impairment cancellers are reduced by sharing filter taps among the cancellers. In a first embodiment, the taps from a unified filter tap bank are shared across all the interference impairment cancellers for all four channels and over all ports. In a second embodiment, a portion of the taps of each filter are shared wherein each canceller comprises a fixed filter tap portion and a shared filter tap portion. A tap allocation algorithm assigns taps to those cancellers that need them the most. A canceller configuration is selected that yields maximal interference mitigation and the taps are allocated accordingly.

17 Claims, 6 Drawing Sheets

INTERFERENCE CANCELLER TAP SHARING IN A COMMUNICATIONS TRANSCEIVER

FIELD OF THE INVENTION

The present invention relates to the field of data communications and more particularly relates to an apparatus for and method of sharing interference canceller taps in a communications transceiver such as a Gigabit Ethernet transceiver.

BACKGROUND OF THE INVENTION

Modern network communication systems are generally of either the wired or wireless type. Wireless networks enable communications between two or more nodes using any number of different techniques. Wireless networks rely on different technologies to transport information from one place to another. Several examples, include, for example, networks based on radio frequency (RF), infrared, optical, etc. Wired networks may be constructed using any of several existing technologies, including metallic twisted pair, coaxial, optical fiber, etc.

Communications in a wired network typically occurs between two communication transceivers over a length of cable making up the communications channel. Each communications transceiver comprises a transmitter and receiver components. A fault along the communication channel causes a disruption in communications between the transceivers. Typically, it is desirable to be able to determine when a fault occurs in the channel. Once a fault is detected, it is desirable to determine information about the fault, such as its location along the channel.

The deployment of faster and faster networks is increasing at an ever quickening pace. Currently, the world is experiencing a vast deployment of Gigabit Ethernet (GE) devices.

Gigabit Ethernet, as well as other high-speed communication schemes, suffers from multiple sources of interference. The receiver must employ interference cancellers in order to reconstruct the transmitted signal. In any practical implementation, however, it is desirable to both minimize the cost of the receiver to consume as little power as possible.

Thus, there is a need for a mechanism for minimizing cost and power consumption while still canceling multiple interferences in a communication link such as an Ethernet connection.

SUMMARY OF THE INVENTION

The present invention is a novel mechanism for sharing filter taps across a plurality of interference cancellers. Each interference canceller may be directed to different interference impairments, such as various Ethernet impairments, including Ethernet 1000Base-T impairments. Various interference impairments include echo cancellation, NEXT cancellation, FEXT detection or cancellation, etc.

Interference impairment cancellers typically consume a substantial portion of digital silicon area in an Ethernet PHY solution. Canceller length is typically planned in accordance with worst-case assumptions while the probability that a specific cabling system will meet the worst-case assumptions in all impairments is low.

The invention is based on the assumption that not all the taps of a canceller have the same importance (i.e. play the same role in interference mitigation). One or more of the cancellers can be made smaller and the unused taps given to other cancellers in accordance with their interference mitigation. Those that mitigate more interference are assigned the extra taps.

Typically it is rare that all or even a majority of the cancellers must be of maximal length. One or more of the cancellers are made shorter and the extra taps are placed where needed. The result is a significant reduction of hardware with the same or nearly the same performance of full length cancellers.

Thus, the cancellers corresponding to the most severe impairments are assigned the extra taps. For example, consider the echo canceller tap coefficients. These are examined in discrete time wherein the magnitudes of the last few coefficients are checked (e.g., the last window of 10 taps). This is repeated for the other cancellers as well. The metric (e.g., sum of squares of the coefficients) is calculated. The canceller configuration yielding the maximum metric is selected since it will have the most effect on the interference.

The canceller tap sharing mechanism of the present invention provides several advantages including: (1) substantial savings in silicon real estate; (2) significant reduction in power consumption; and (3) improved transceiver performance including lower total tap count and lower least mean squares (LMS) noise by using the bank of taps only in cancellers that require it (additional filter taps results in increased LMS noise and a degradation of total performance).

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is therefore provided in accordance with the invention, a method of sharing filter taps amongst a plurality of interference cancellers in a communications transceiver coupled to a communications channel, the method comprising the steps of providing a pool of filter taps shareable amongst the plurality of interference cancellers, determining a level of interference mitigation achieved by each interference canceller and allocating the shareable filter taps amongst the plurality of interference cancellers in accordance with the level of interference mitigation achieved by each interference canceller.

There is also provided in accordance with the invention, a method of sharing filter taps amongst a plurality of interference cancellers in a communications transceiver coupled to a communications channel, each interference canceller comprising a set of fixed filter taps and a set of shareable filter taps shareable amongst the plurality of interference cancellers, the method comprising the steps of determining a set of allowed canceller tap configurations, for each allowed canceller tap configuration, adapting the filter taps in each canceller within the configuration, calculating a metric as a function of the tap coefficients and selecting a canceller tap configuration that yields the best value of the metric.

There is further provided in accordance with the invention, an apparatus for sharing filter taps amongst a plurality of interference cancellers in a communications transceiver coupled to a communications channel comprising a pool of filter taps shareable amongst the plurality of interference cancellers, a controller coupled to the pool of filter taps, the controller comprising means for determining a level of interference mitigation achieved by each interference canceller and means for allocating the shareable filter taps amongst the plurality of interference cancellers in accordance with the level of interference mitigation achieved by each interference canceller.

There is also provided in accordance with the invention, an apparatus for sharing filter taps amongst a plurality of interference cancellers in a communications transceiver coupled to a communications channel comprising a plurality of interference cancellers, each interference canceller comprising a set of fixed filter taps and a set of shareable filter taps shareable amongst the plurality of interference cancellers, a controller coupled to the plurality of interference cancellers, the controller comprising means for determining a set of allowed canceller tap configurations, means for adapting, for each allowed canceller tap configuration, the filter taps in each canceller within the configuration, means for calculating a metric as a function of the tap coefficients and means for selecting a canceller tap configuration that yields the best value of the metric.

There is further provided in accordance with the invention, a communications transceiver comprising a transmitter, a receiver, a plurality of interference cancellers coupled to the transmitter and the receiver, a controller coupled to the transmitter, the receiver and the plurality of interference cancellers, the controller operative to determine a level of interference mitigation achieved by each interference canceller and allocate the shareable filter taps amongst the plurality of interference cancellers in accordance with the level of interference mitigation achieved by each interference canceller.

There is also provided in accordance with the invention, a communications transceiver comprising a transmitter, a receiver, a plurality of interference cancellers coupled to the transmitter and the receiver, each interference canceller comprising a set of fixed filter taps and a set of shareable filter taps shareable amongst the plurality of interference cancellers, a controller coupled to the plurality of interference cancellers, the controller operative to determine a set of allowed canceller tap configurations, adapt, for each allowed canceller tap configuration, the filter taps in each canceller within the configuration, calculate a metric as a function of the tap coefficients and select a canceller tap configuration that yields a maximal value of the metric.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|---|---|
| AGC | Automatic Gain Control |
| ANEXT | Alien Near-End Crosstalk |
| ASIC | Application Specific Integrated Circuit |
| AWGN | Additive White Gaussian Noise |
| DSP | Digital Signal Processor |
| ELFEXT | Equal Level Far-End Crosstalk |
| FBE | Feedback Equalizer |
| FEXT | Far-End Crosstalk |
| FFE | Feedforward Equalizer |
| FIR | Finite Impulse Response |
| FPGA | Field Programmable Gate Array |
| GE | Gigabit Ethernet |
| HDL | Hardware Description Language |
| IC | Integrated Circuit |
| IEEE | Institute of Electrical and Electronics Engineers |
| ISI | Intersymbol Interference |
| LMS | Least Mean Square |
| LPF | Low Pass Filter |
| MDELFEXT | Multiple Disturber Equal Level Far-End Crosstalk |
| NEXT | Near-End Crosstalk |
| PSELFEXT | Power Sum Equal Level Far-End Crosstalk |
| PSNEXT | Power Sum Near-End Crosstalk |
| RF | Radio Frequency |
| STP | Shielded Twisted Pair |
| UTP | Unshielded Twisted Pair |

DETAILED DESCRIPTION OF THE INVENTION

The present invention is a novel mechanism for sharing filter taps across a plurality of interference cancellers. Each interference canceller may be adapted to address to different interference impairments, such as different Ethernet impairments, including Ethernet 1000Base-T impairments. Various interference impairments include echo cancellation, NEXT cancellation, FEXT detection or cancellation, etc.

To aid in understanding the principles of the present invention, the description of the interference canceller tap sharing mechanism is provided in the context of an Ethernet transceiver circuit that can be realized in an integrated circuit (IC). The interference canceller tap sharing mechanism of the present invention has been incorporated in an Ethernet IC adapted to provide 10Base-T, 100Base-Tx and 1000Base-T communications over a metallic twisted pair channel. Although the invention is described in the context of a gigabit Ethernet PHY communications link, it is appreciated that one skilled in the art can apply the principles of the invention to other communication systems without departing from the scope of the invention.

It is appreciated by one skilled in the art that the interference canceller tap sharing mechanism of the present invention can be adapted for use with numerous other types of wired communications networks such as coaxial channels, etc. without departing from the scope of the invention.

Note that throughout this document, the term communications device is defined as any apparatus or mechanism adapted to transmit, receive or transmit and receive data through a medium. The term communications transceiver is defined as any apparatus or mechanism adapted to transmit and receive data through a medium. The communications device or communications transceiver may be adapted to communicate over any suitable medium, including wired media such as twisted pair cable or coaxial cable. The term Ethernet network is defined as a network compatible with any of the IEEE 802.3 Ethernet standards, including but not limited to 10Base-T, 100Base-Tx or 1000Base-T over shielded or unshielded twisted pair wiring. The terms communications channel, link and cable are used interchangeably.

Figure 1A:
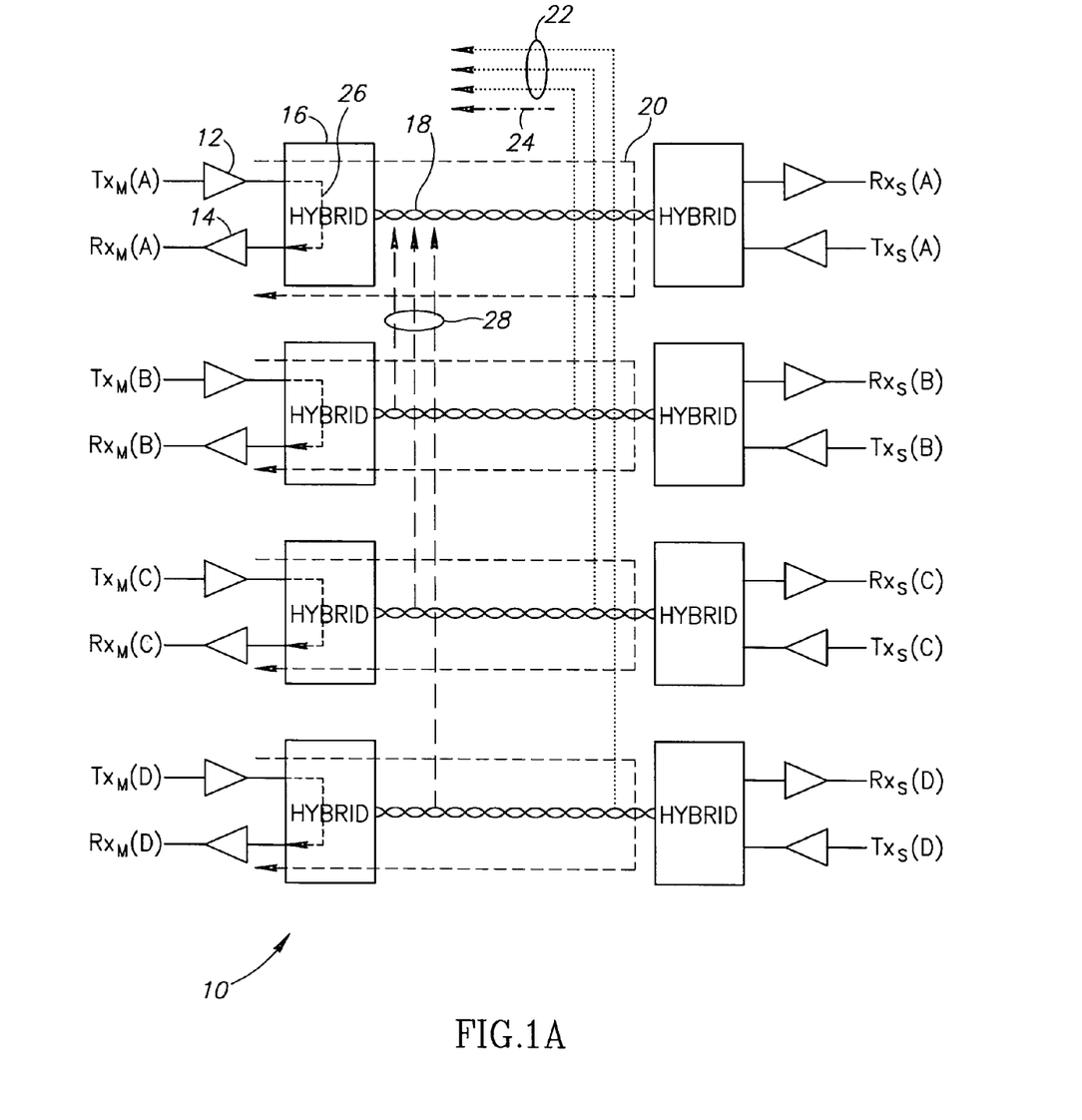
FIG. 1A is a block diagram illustrating the typical 1000Base-T noise environment.

The Ethernet PHY operating environment is typically exposed to diverse interference sources. A block diagram illustrating the typical 1000Base-T noise environment is shown in FIG. 1A. The environment, generally referenced 10, comprises two transceivers Master (M) and Slave (S), each comprising a plurality of transmitters 12, receivers 14 and hybrid circuits 16. The transceivers are coupled by a plurality of twisted pair cables 18. A gigabit Ethernet communications link is characterized by full duplex transmission over Category 5 and higher cable that may be shielded (STP) or unshielded twisted pair (UTP) cable. The cable comprises four twisted metallic copper pairs wherein all four pairs are used for both transmission and reception. Note that for notation purposes, each one of the twisted pairs is referred to as a 'channel' and the combined four twisted pair bundle generating one gigabit Ethernet connection is referred to as a 'cable'.

In operation, each transceiver receives an input data stream from an external data source such as a host or other entity (not shown). The transceiver generates an output symbol stream from the input data stream and transmits the output symbol stream over the communications channel to the transceiver on the other side. The transceivers on either end of a channel are considered link partners. One is designated a master, the other a slave. A link partner can be either active or inactive. An inactive link partner is a transceiver that is not transmitting at the moment. An active link partner is a transceiver that is currently transmitting.

In the receive direction, each transceiver receives a receive signal from the communications channel. The receive signal may comprise an input symbol stream transmitted from the link partner. The transceiver generates an output from this input symbol stream. The receive signal may also comprise a signal representing energy from any number of interference sources, e.g., an echo signal representing the original transmitted signal that has been reflected back towards the transceiver. The transmitted signal may be reflected back due to a channel fault such as an open cable, shorted cable, unmatched load or any irregularities in impedance along the length of the cable. Such irregularities may be caused by broken, bad or loose connectors, damaged cables or other faults.

The Ethernet PHY environment is typically exposed to diverse interference sources. Several of these interference sources are illustrated in FIG. 1A, and include: near-end echo 26, far-end echo 20, attenuation 24, near-end crosstalk 28 and far-end crosstalk 22. The main interference sources (i.e. Ethernet impairments) an Ethernet transceiver is exposed to are described below. Note that these and other impairments may be applicable to other communication link PHY schemes and are not to be limited to gigabit Ethernet. The requirements of the impairments to be monitored are defined by the IEEE 802.3 1000Base-T specification. The requirements presented infra apply to a 100 meter cable at all frequencies from 1 MHz to 100 MHz.

Insertion loss/Attenuation: Insertion loss (denoted by line 24 in FIG. 1A) is the intersymbol interference (ISI) introduced to the far side transmitted signal and is compensated by the equalizer in the receiver. The worst case insertion loss is defined by the IEEE 802.3 standard as:

$$\text{Insertion\_Loss}(f) < 2.1 f^{0.529} + 0.4/f \, \text{dB} \quad (1)$$

where f denotes frequency.

Return loss (echo)/near-end echo rejection: The echo signal (denoted by line 26 in FIG. 1A) is the reflection of the transmitted signal unto the receiver path. The echo can be a near-end echo reflection due to the full duplex usage of each pair or a far-end reflection due to unmatched hardware connection components along the cable topology or at the far-side connector. The worst case far-end return loss is defined by the IEEE 802.3 standard as:

$$\text{Return\_Loss}(f) \begin{Bmatrix} 15 & (1-20 \text{ MHz}) \\ 15 - 10\log_{10}(f/20) & (20-100 \text{ MHz}) \end{Bmatrix} \text{dB} \quad (2)$$

where f denotes frequency and where the requirements for CAT5E is modified from 15 dB to 17 dB (i.e. an increase of 2 dB). Note that a high level of near-end echo signal may indicate a printed circuit board fault. Note also that the near-end echo reflection level is implementation specific and may be compensated for by the hybrid analog block 16 (FIG. 1A).

Near-end crosstalk (NEXT) and far-end crosstalk (FEXT): NEXT crosstalk (denoted by lines 28 in FIG. 1A) and FEXT crosstalk (denoted by line 22 in FIG. 1A) are undesired signals coupled between adjacent pairs. The NEXT is noise coupled from near-side adjacent transmitters (i.e. of the other three pairs). FEXT is noise coupled from far-side adjacent transmitters.

The worst case NEXT coupling is defined by the IEEE 802.3 standard as:

$$\text{NEXT}(f) > 27.1 - 16.8 \log_{10}(f/100) \text{dB} \quad (3)$$

where f denotes frequency. Note that the standard also defines the following properties:

1. Equal Level FEXT (ELFEXT) is defined as the noise coupled from far-side transmitters to a far-side link partner and can be formulated as $$\text{ELFEXT} = \text{FEXT} - \text{Insertion\_loss} \quad (4)$$

2. Multiple Disturber ELFEXT (MDELFEXT) is defined as the different ELFEXT coupled from each of the three adjacent link partners in accordance with the following masks:

$$MDELFEXT(f) = \begin{cases} 17 - 20\log_{10}(f/100) \\ 19.5 - 20\log_{10}(f/100) \text{ dB} \\ 23 - 20\log_{10}(f/100) \end{cases} \quad (5)$$

where f denotes frequency and where the sum of the three ELFEXT signals is defined as Power Sum ELFEXT (PSELFEXT) which is limited by:

$$\text{PSELFEXT}(f) > 14.4 - 20 \log_{10}(f/100) \text{dB} \quad (6)$$

Figure 1B:
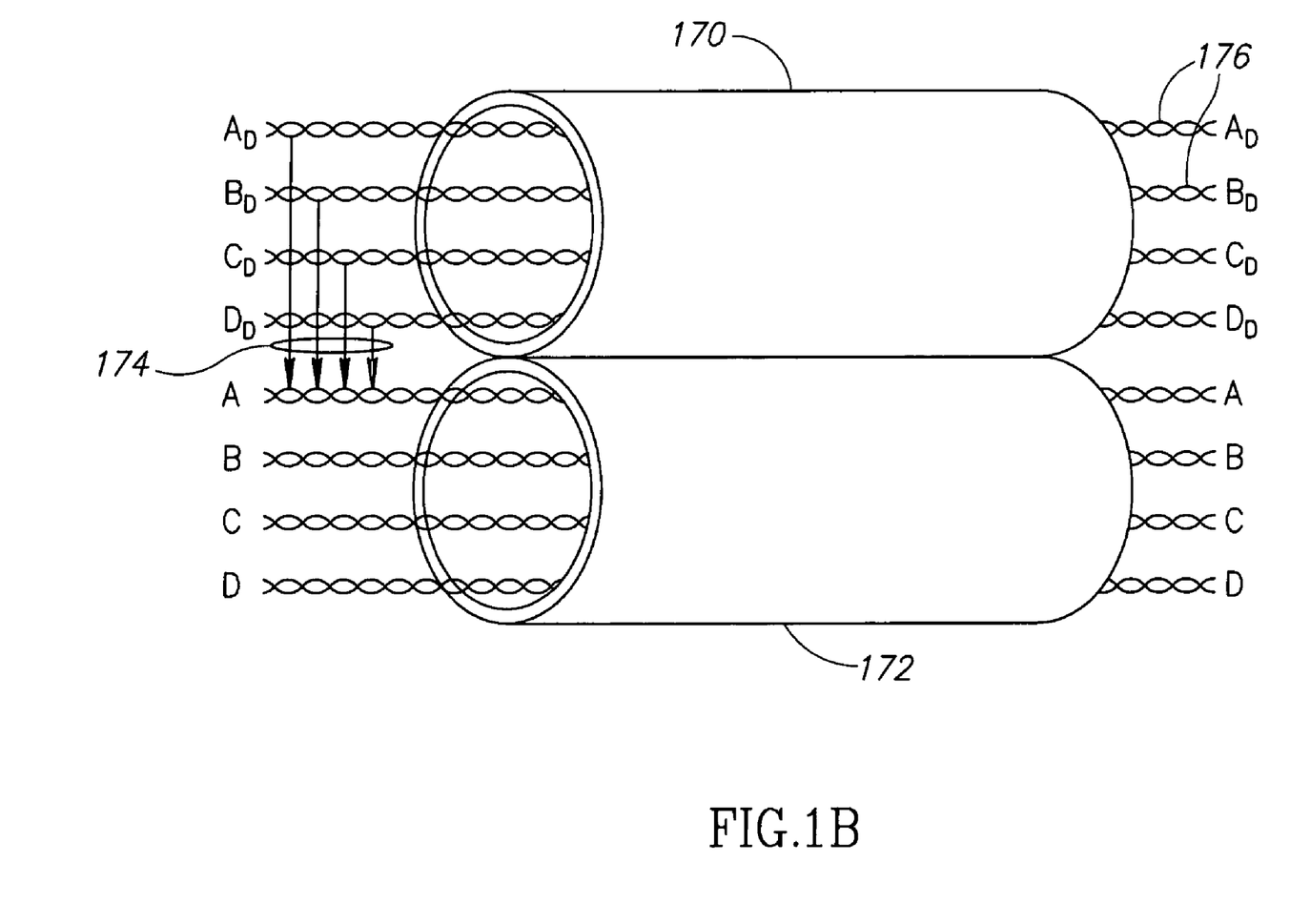
FIG. 1B is a diagram illustrating the alien NEXT (ANEXT) noise environment.

Alien NEXT (ANEXT): A diagram illustrating the alien NEXT (ANEXT) noise environment is shown in FIG. 1B. The ANEXT noise (denoted by lines 174) is coupled to the modem receive path associated with the twisted pairs 176 in cable 172 from adjacent twisted pair links in cable 170. Unlike the NEXT noise signals, which are generated from a known transmitted sequence and therefore can be cancelled, the ANEXT noise signal is unknown and is thus much harder to cancel. The IEEE 802.3 standard defines the ANEXT as a 25 mV peak-to-peak signal generated by an attenuated 100Base-TX signal coupled to one of the receiver pairs.

Note that this model for the ANEXT may not be accurate since the ANEXT cannot be separated from the external coupled noise definition. It is assumed, however, that the external noise is composed of AWGN and the colored Alien NEXT. The standard does specify the PSNEXT loss as follows:

$$\text{PSNEXT\_loss}(f) < 35 - 15 \log_{10}(f/100) \text{dB} \tag{7}$$

where f denotes frequency.

External noise: External noise is defined by the IEEE 802.3 standard as noise coupled from external sources and is bounded at 40 mV peak-to-peak (with 3 dB LPF at 100 MHz).

The echo, NEXT and sometimes the FEXT impairments are mitigated using dedicated cancellers. These cancellers typically consume significant hardware resources and a substantial amount of digital transceiver die area. In a typical gigabit Ethernet transceiver, for example, the integrated circuit (IC) area dedicated to the canceller may consume over 50% of the total digital portion of the IC.

Figure 2:
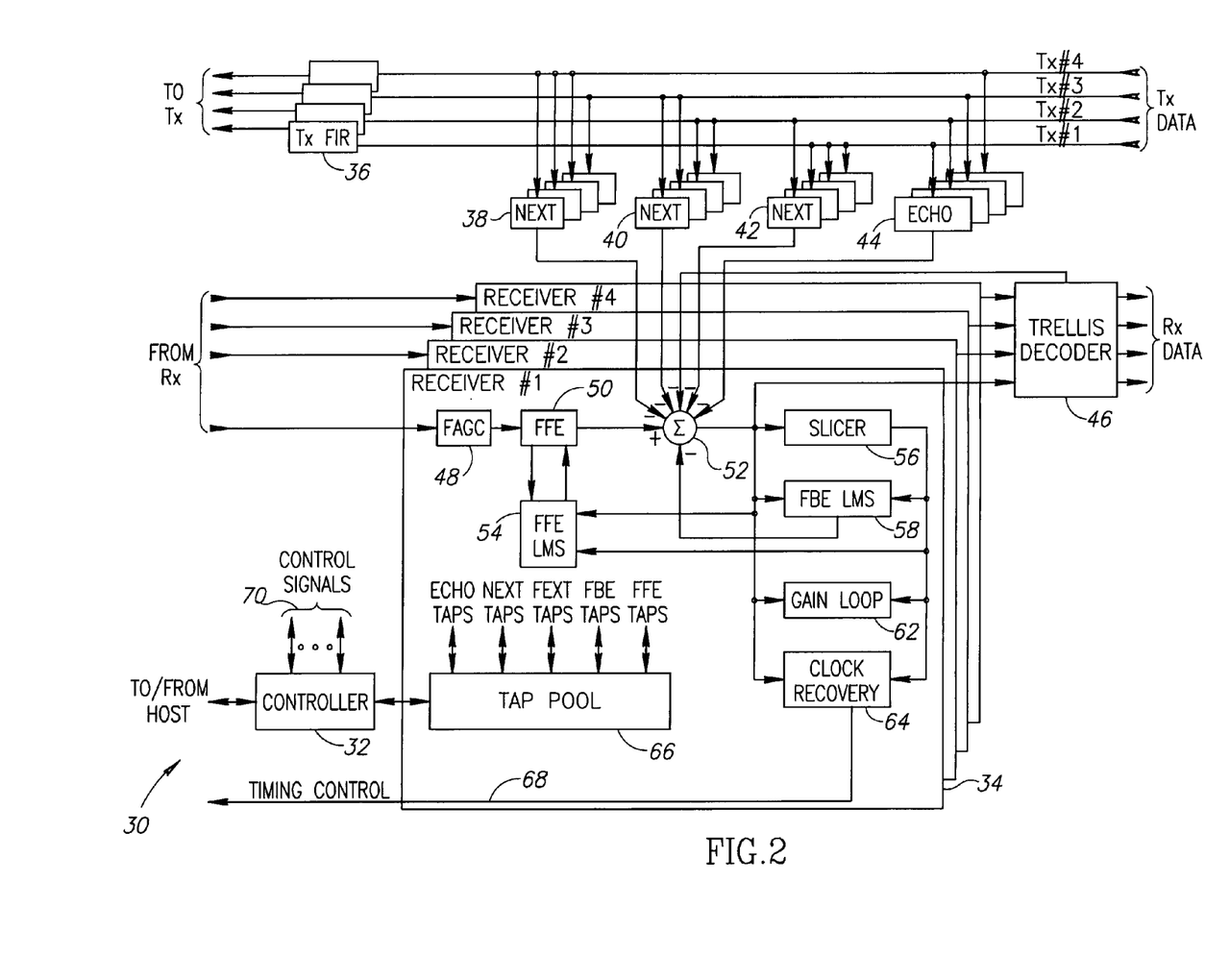
FIG. 2 is a block diagram illustrating an example gigabit Ethernet transceiver incorporating the canceller tap sharing scheme of the present invention.

A block diagram illustrating an example gigabit Ethernet transceiver incorporating the canceller tap sharing scheme of the present invention is shown in FIG. 2. The transceiver, generally referenced 30, comprises TX FIR filter blocks 36 (one for each of four twisted pairs), four receiver blocks 34, controller 32, NEXT blocks 38, 40, 42, echo canceller 44 and Trellis decoder 46. Each of the receiver blocks 34 comprises fine automatic gain control (AGC) 48, feed forward equalizer (FFE) 50, least mean squares (LMS) block 54, adder 52, slicer 56, feedback equalizer (FBE) LMS 58, gain loop 62, clock recovery block 64 and interference canceller tap pool 66.

In operation, receivers #1, #2, #3 and #4 receive the appropriate NEXT and echo canceller signals from the NEXT blocks 38, 40, 42 and echo canceller blocks 44, respectively. For each receiver, corresponding to a twisted pair, the NEXT is calculated from the TX signals for the other three pairs. For example, the NEXT for receiver #1 (i.e. pair #1), is calculated from signals TX #2, TX #3 and TX #4.

The clock recovery block generates the timing control signal 68. Controller 32 communicates with a host (not shown) and provides administration, configuration and control to the transceiver via plurality of control signals 70.

The canceller tap pool 66, in combination with the controller and the impairment cancellers, implements the interference canceller tap sharing mechanism of the present invention and is adapted to share filter taps with various impairment cancellers/detectors including, for example, echo canceller, NEXT canceller, FEXT detector or canceller, FBE block and FFE block. It is appreciated that the invention is operative to share filter taps with any impairment processing block utilizing filters comprising a plurality of filter taps.

In a robust transceiver design, the length of the canceller is determined in accordance with the expected worst-case channel and worst-case required cable length. This may result in an over design of the canceller (i.e. excess filter taps that are rarely if ever used) since the probability that a particular communication link will have to handle worst-case echo, NEXT and FEXT impairments is very low. For example consider that the dominant parameter defining NEXT impairments is usually the quality of near-end situated connecting hardware while FEXT noise is generated by constant signal leakage from one twisted pair to another during signal propagation.

To reduce the hardware requirement, power consumption and IC real estate area requirements of the noise impairment cancellers, the present invention provides a mechanism to share canceller taps among the various noise impairment cancellers. Typically, all the noise impairment cancellers will not require worst case filter tap length, thus permitting a shifting of spare taps to those cancellers that require it. For example consider a channel with severe echo reflections but relatively shorter NEXT impairments. In this case, the invention will allocate additional taps to the echo canceller yielding a longer echo canceller at the expense of a shorter NEXT canceller. In this manner, the invention achieves a significantly better tradeoff between performance versus hardware cost.

The present invention provides two embodiments wherein each uses filter tap sharing to reduce the hardware requirements of the noise impairment cancellers. The first embodiment uses a unified filter tap bank and shares it across all the noise impairment cancellers (e.g., echo, NEXT, FEXT, etc.) for all four channels and over all ports (assuming the transceiver IC integrates several ports together). In the second embodiment, the implementation is simplified by sharing a portion of the taps of each filter. The first and second embodiments are described in more detail infra.

Figure 3:
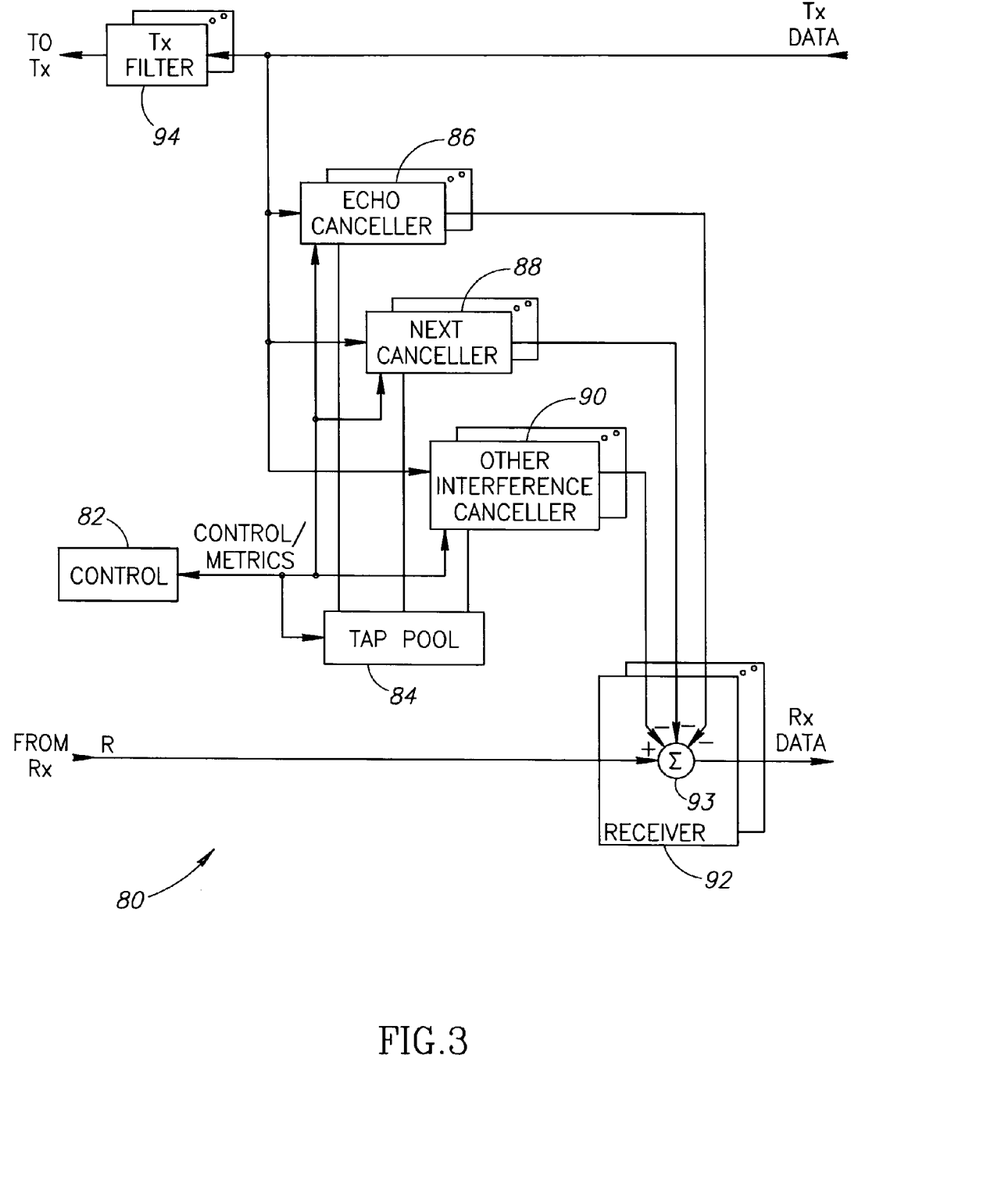
FIG. 3 is a block diagram illustrating a first embodiment of the canceller tap sharing scheme of the present invention incorporating a pool of taps to be shared amongst the cancellers.

A block diagram illustrating a first embodiment of the canceller tap sharing scheme of the present invention incorporating a pool of taps to be shared amongst the cancellers is shown in FIG. 3. For clarity sake, only a portion of the transceiver is shown. The portion shown, generally referenced 80, comprises transmit filters 94, receivers 92, controller 82, echo cancellers 86, NEXT cancellers 88, other interference cancellers 90 and filter tap pool 84. Note that the echo, NEXT and other interference cancellers are shown for example purposes only. It is contemplated that the application of the present invention to other noise impairment cancellers, such as FBE and FFE, is intended to be within the scope of the present invention.

In operation, the various noise impairment cancellers all share the taps in the unified bank of filter taps 84. Those cancellers that require additional taps over and above their default number of taps are assigned additional taps. The allocation of the filter taps is determined by analyzing the demands placed on each canceller. The controller 82 or other entity (internal or external) implements a tap allocation algorithm described in more detail infra. Once the taps are allocated, the results of each canceller are subtracted from the receive signal via adder 93 to yield an impairment compensated receive signal.

Figure 4:
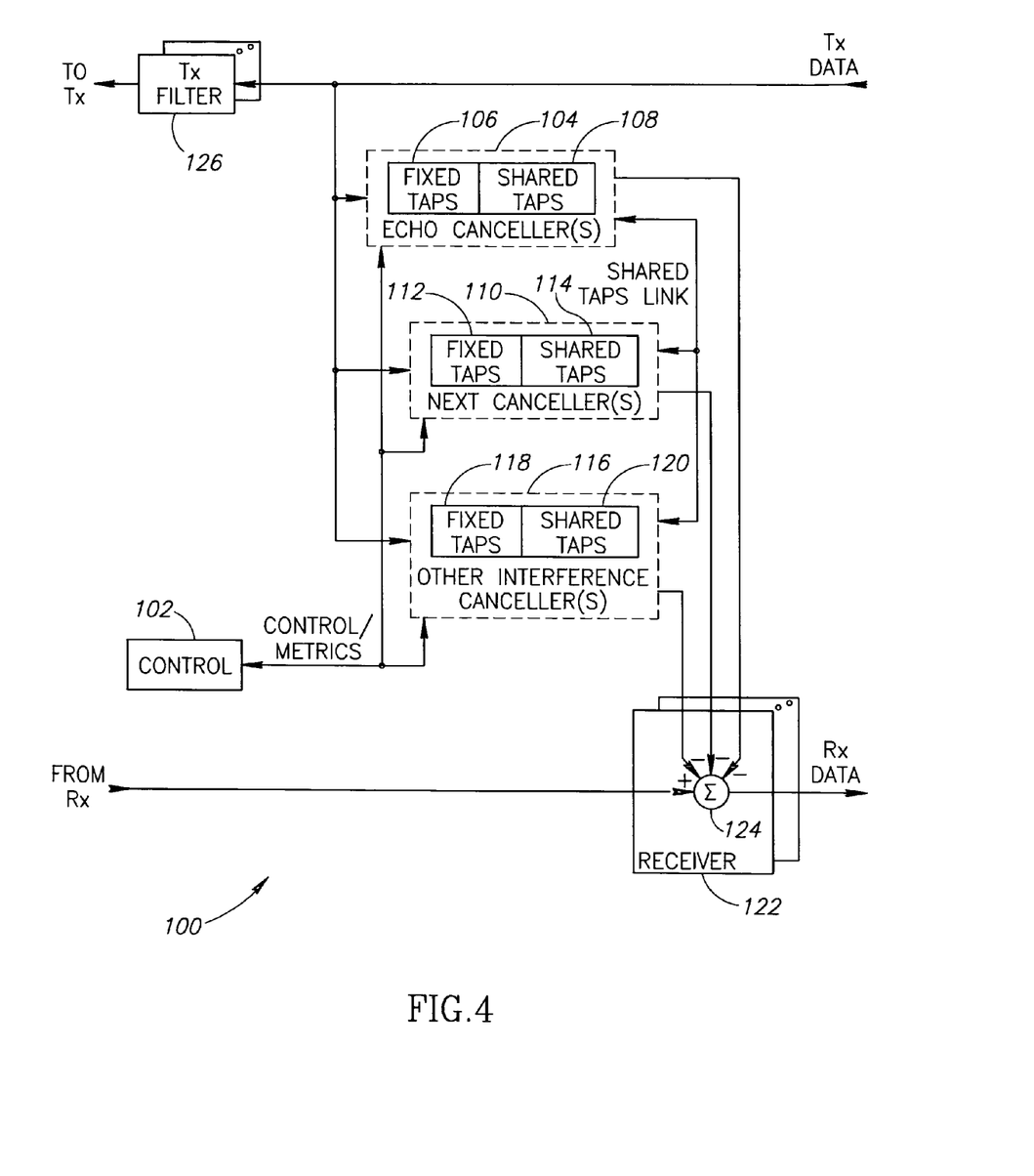
FIG. 4 is a block diagram illustrating a second embodiment of the canceller tap sharing scheme of the present invention incorporating cancellers having fixed taps and shareable taps to be shared amongst the cancellers.

A block diagram illustrating a second embodiment of the canceller tap sharing scheme of the present invention incorporating cancellers having fixed taps and shareable taps to be shared amongst the cancellers is shown in FIG. 4. For clarity sake, only a portion of the transceiver is shown. The portion shown, generally referenced 100, comprises a transmit filters 126, receivers 122, controller 102, echo cancellers 104, NEXT cancellers 110 and other interference cancellers 116. Note that the echo, NEXT and other interference cancellers are shown here for example purposes only. It is contemplated that the application of the present invention to other noise impairment cancellers is within the scope of the present invention.

Each of the impairment cancellers comprises a plurality of filter taps. The filter taps are divided into two portions: a fixed portion and a shared portion. In particular, the echo cancellers comprise fixed taps 106 and shared taps 108; the NEXT cancellers comprise fixed taps 112 and shared taps 114; and the other interference cancellers comprise fixed taps 118 and shared taps 120.

In operation, the various noise impairment cancellers all use their fixed taps which are not sharable. The shared taps of each canceller may be used by that canceller or shared among all the other cancellers depending on the needs of each canceller. Those cancellers that require additional taps over and above their fixed number of taps are assigned taps from the shared tap portion of other cancellers. The allocation of the shared filter taps is determined by analyzing the demands placed on each canceller. The controller 102 or other entity (internal or external) implements a tap allocation algorithm described in more detail infra. Once the taps are allocated, the results of each canceller are subtracted from the receive signal via adder 124 to yield an impairment compensated receive signal.

As an illustrative example, consider an echo canceller comprising 100 taps total divided into 90 fixed taps and 10 shared taps. Consider also a NEXT canceller comprising 20 filter taps total divided into 10 fixed taps and 10 shared taps. Depending on the level of the echo and NEXT impairments, a 90 tap echo canceller and a 10 tap NEXT canceller can be implemented with 10 'floating' taps used to extend the echo canceller to 100 taps or the NEXT canceller to 20 taps.

Two methods of tap allocation (i.e. canceller length) determination are contemplated by the invention: manual and automatic. In manual allocation, the taps of each canceller are configured manually based on an analysis of the channel. Thus, if certain impairments are found to be stronger, additional taps can be allocated for the cancellers corresponding to these impairments.

Figure 5:
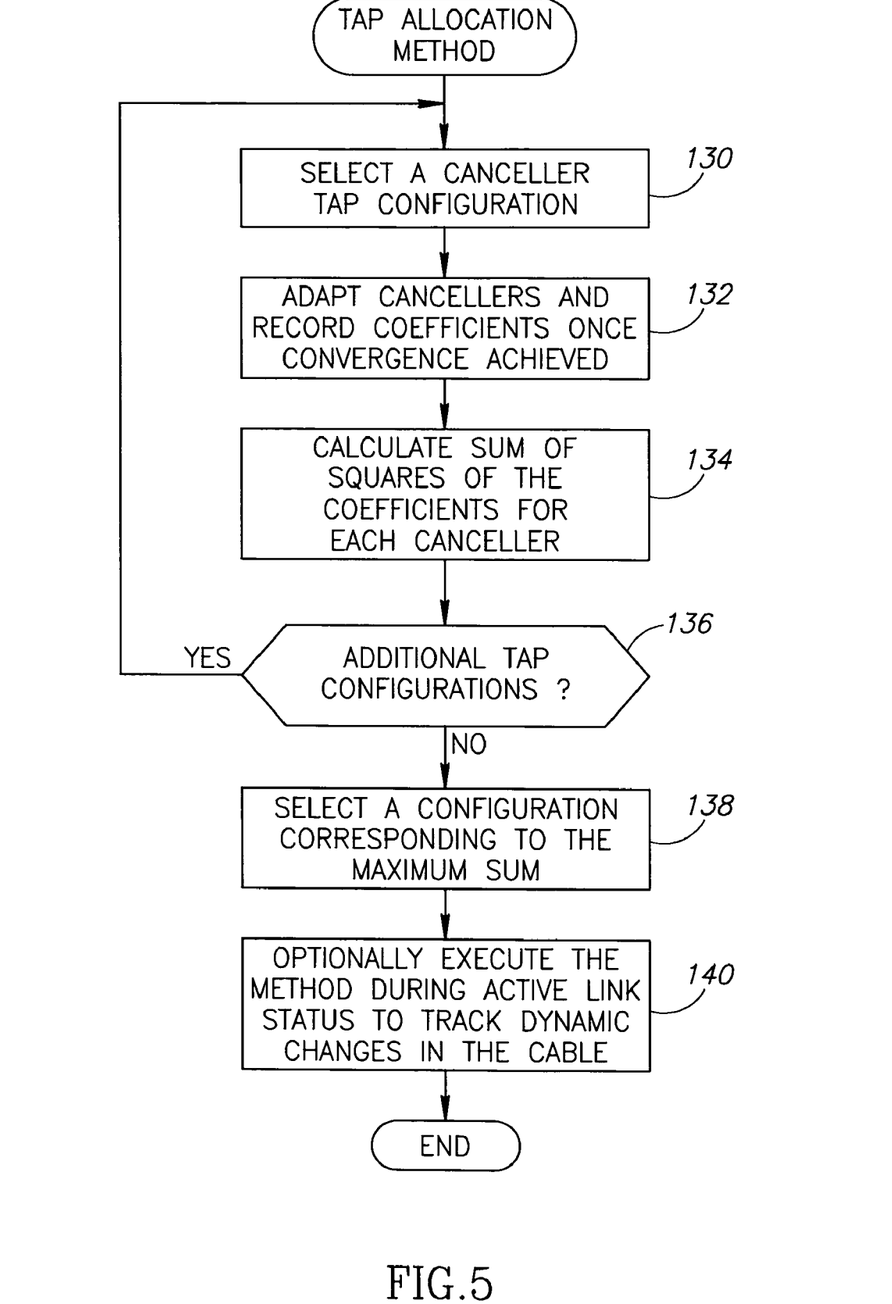
FIG. 5 is a flow diagram illustrating the shared tap allocation method of the present invention.

The automatic canceller length method will now be described in more detail. A flow diagram illustrating the shared tap allocation method of the present invention is shown in FIG. 5. The tap allocation algorithm is executed during transceiver initialization (i.e. a process that is called during the gigabit Ethernet startup procedure) and is applicable to both the first and second embodiments. The algorithm can also be executed during active link status (i.e. after the startup procedure has completed) in order to track dynamic changes in the cable (i.e. the channel).

The algorithm is operative to examine all allowed canceller configurations. Considering the number of cancellers implemented, each having either a minimum or a fixed tap length, there are likely a plurality of allowed configurations. For each configuration, the filter tap length of each canceller is set to a permitted value. In the example described supra, one possible configuration comprises the echo canceller with length 100 and NEXT canceller of length 10. A second possible configuration comprises the echo canceller with length 90 and NEXT canceller of length 20. In this example the algorithm considers both configurations in determining the allocation of taps.

First, a canceller tap configuration from among the permitted configurations is selected (step 130). Each allowed configuration is checked separately. Each canceller in the selected configuration is adapted and the values of the tap coefficients are recorded once convergence is achieved (step 132). A metric is then computed which is used to compare the configuration against each other. The metric may be any suitable metric. In the example embodiment described herein, the metric calculated comprises the sum of the squares of the coefficients of each canceller (step 134).

$$\text{metric} = \Sigma \text{coef\_on\_trial}^2 \qquad (8)$$

where coef_on_trial denotes the tap coefficients of each tap in each canceller within a configuration.

Other possible metrics suitable for use with the present invention include the Mean Square Error (MSE) or the Signal-to-Noise Ratio (SNR) after canceling the impairments of the received signal. Note that if the MSE is used as a metric, the algorithm chooses the solution yielding the minimal metric, rather than the maximal metric. The method continues (step 136) to select all the remaining possible configurations, adapt the cancellers in each configuration (step 132) and calculate and store the metric for later comparison (step 134).

Once the metric has been calculated for each configuration, the metric calculation results for each are compared and the configuration corresponding to the maximum metric (i.e. maximum sum) is selected (step 138). The algorithm chooses the configuration that yields a maximal metric from among all configuration options. Thus, it is guaranteed that the shared taps are allocated in a way that results in maximal interference mitigation. In other words, the taps are allocated to the cancellers that will have the most effect on the interference, i.e. those cancellers corresponding to impairments that cause large reflections at the end portion of the cable. As stated supra, the algorithm can be optionally executed during active link status to track dynamic chances in the cable (step 140).

Note that the invention is based on the assumption that not all the taps of a canceller have the same importance (i.e. play the same role in noise mitigation). One or more of the cancellers can be made smaller and the unused taps given to other cancellers in accordance with their interference mitigation. Those that mitigate more noise are assigned the extra taps.

Typically it is rare that all or even a majority of the cancellers must be of maximal length. One or more of the cancellers are made shorter and the extra taps are placed where needed. The result is a signification reduction of hardware with the same or nearly the same performance of full length cancellers.

Thus, the cancellers corresponding to the most severe impairments are assigned the extra taps. For example, consider the echo canceller tap coefficients. These are examined in discrete time wherein the magnitudes of the last few coefficients are checked (e.g., the last window of 10 taps). This is repeated for the other cancellers as well. The metric (e.g., sum of squares of the coefficients) is calculated. The canceller configuration yielding the maximum metric is selected since it will have the most effect on the interference.

The tap allocation determined by the mechanism of the present invention is cable dependent. The number of fixed taps, however, is decided a priori and reflects a tradeoff between the number of taps and the level of interference cancellation. Assigning fewer taps to a canceller on the one hand results in reduced interference mitigation. A higher number of taps will yield better interference mitigation but at the cost of increased hardware. One criterion that can be used is the width of the last reflections received in an analysis of the cable. Usually the last canceller taps (e.g., echo, NEXT, etc.) are rarely used and have relatively small values (i.e. the impairments corresponding to the end portion of the cable). If these impairments are relatively small, the taps corresponding to the last portion of the cable play a much smaller role in mitigating the interference and thus can be shared and allocated to other cancellers. Preferably, these taps should be shared with cancellers that have substantially impairments associated with the last portion of the cable.

In addition to a reduction in hardware by sharing taps, this invention provides a reduction in power consumption by optionally shutting down those taps that are not used. The unused taps comprise shared taps (either from the tap pool or the shared portion of canceller taps) that are not allocated to a canceller and can thus be shutdown to save power.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of sharing filter taps amongst a plurality of interference cancellers in a communications transceiver coupled to a communications channel, each interference canceller comprising a set of fixed filter taps and a set of shareable filter taps shareable amongst said plurality of interference cancellers, said method comprising the steps of:
   determining a set of allowed canceller tap configurations;
   for each allowed canceller tap configuration, adapting the filter taps in each canceller within said configuration;
   calculating a metric as a function of the tap coefficients; and
   selecting a canceller tap configuration that yields the best value of said metric.

2. The method according to claim 1, wherein said metric comprises a sum of squares of said filter tap coefficients.

3. The method according to claim 1, wherein said metric comprises the signal-to-noise ratio after impairment cancellation.

4. The method according to claim 1, wherein said metric comprises the mean square error after impairment cancellation.

5. The method according to claim 1, wherein said plurality of interference cancellers comprise at least one echo canceller.

6. The method according to claim 1, wherein said plurality of interference cancellers comprise at least one near-end crosstalk (NEXT) canceller.

7. The method according to claim 1, wherein said communications channel comprises an Ethernet twisted pair cable.

8. The method according to claim 1, wherein said communications transceiver comprises a gigabit Ethernet transceiver.

9. An apparatus for sharing filter taps amongst a plurality of interference cancellers in a communications transceiver coupled to a communications channel, comprising:
   a plurality of interference cancellers, each interference canceller comprising a set of fixed filter taps and a set of shareable filter taps shareable amongst said plurality of interference cancellers;
   a controller coupled to said plurality of interference cancellers, said controller comprising:
   means for determining a set of allowed canceller tap configurations;
   means for adapting, for each allowed canceller tap configuration, the filter taps in each canceller within said configuration;
   means for calculating a metric as a function of the tap coefficients; and
   means for selecting a canceller tap configuration that yields the best value of said metric.

10. The apparatus according to claim 9, wherein said metric comprises a sum of squares of said filter tap coefficients.

11. The apparatus according to claim 9, wherein said metric comprises the signal-to-noise ratio after impairment cancellation.

12. The apparatus according to claim 9, wherein said metric comprises the mean square error after impairment cancellation.

13. The apparatus according to claim 9, wherein said plurality of interference cancellers comprise at least one echo canceller.

14. The apparatus according to claim 9, wherein said plurality of interference cancellers comprise at least one near-end crosstalk (NEXT) canceller.

15. The apparatus according to claim 9, wherein said communications channel comprises an Ethernet twisted pair cable.

16. The apparatus according to claim 9, wherein said communications transceiver comprises a gigabit Ethernet transceiver.

17. A communications transceiver, comprising:
   a transmitter;
   a receiver;
   a plurality of interference cancellers coupled to said transmitter and said receiver, each interference canceller comprising a set of fixed filter taps and a set of shareable filter taps shareable amongst said plurality of interference cancellers;
   a controller coupled to said plurality of interference cancellers, said controller operative to:
   determine a set of allowed canceller tap configurations;
   adapt, for each allowed canceller tap configuration, the filter taps in each canceller within said configuration;
   calculate a metric as a function of the tap coefficients; and
   select a canceller tap configuration that yields a maximal value of said metric.

* * * * *